(12) United States Patent
Samuthirapandian et al.

(10) Patent No.: US 11,676,497 B2
(45) Date of Patent: Jun. 13, 2023

(54) SYSTEMS AND METHODS FOR FOR PRESENTING AN RTA WAYPOINT WITH ASSOCIATED TIME CONSTRAINTS

(71) Applicant: HONEYWELL INTERNATIONAL INC., Charlotte, NC (US)

(72) Inventors: Subash Samuthirapandian, Tirunelveli (IN); Thea Feyereisen, Hudson, WI (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 120 days.

(21) Appl. No.: 17/207,010

(22) Filed: Mar. 19, 2021

(65) Prior Publication Data

US 2022/0208012 A1   Jun. 30, 2022

(30) Foreign Application Priority Data

Dec. 31, 2020 (IN) .............................. 202011057525

(51) Int. Cl.
*G08G 5/00* (2006.01)

(52) U.S. Cl.
CPC .......... *G08G 5/0047* (2013.01); *G08G 5/0004* (2013.01); *G08G 5/0021* (2013.01); *G08G 5/0034* (2013.01)

(58) Field of Classification Search
CPC .. G08G 5/0047; G08G 5/0004; G08G 5/0021; G08G 5/0034; G08G 5/0013; G08G 5/0052; G01C 23/00
See application file for complete search history.

(56) References Cited

U.S. PATENT DOCUMENTS

| 7,765,061 B1 | 7/2010 | Barber et al. |
| 8,099,201 B1 | 1/2012 | Barber et al. |
| 8,244,466 B2 | 8/2012 | DeJonge et al. |

(Continued)

OTHER PUBLICATIONS

Eurocontrol Experimental Centre, Effect of Aircraft Time Keeping Ability on Arrival Traffic Control Performance—Probabilistic Modelling—4D Trajectory Management Validation—Modelling 2008, EEC Technical/Scientific Report No. 2009-010, Project: EEC/Airbus RTA for ATC issued Apr. 2009.

(Continued)

*Primary Examiner* — Shon G Foley
(74) *Attorney, Agent, or Firm* — Lorenz & Kopf LLP (57) ABSTRACT

Systems and methods for presenting an RTA waypoint with associated time constraints. The system includes a flight management system (FMS) providing an assigned flight plan with a plurality of waypoints; a display device configured to render a current location and trajectory of the aircraft in a navigation display and in a vertical display; and a controller circuit. The system locates the RTA waypoint among the plurality of waypoints, as a function of the flight plan and the current location and trajectory of the aircraft. The system identifies a time constraint associated with the RTA waypoint. The system uses the time constraint to determine a type, from among an "at", a "before", and an "after", for the RTA waypoint; and, assigns a preprogrammed visual encoding scheme for the type to the RTA waypoint. The system presents the RTA waypoint, using the visual encoding scheme, on the display device.

20 Claims, 5 Drawing Sheets

(56) References Cited

U.S. PATENT DOCUMENTS

| | | |
|---|---|---|
| 9,086,280 B2 | 7/2015 | Gurusamy et al. |
| 9,494,945 B2 | 11/2016 | Coulmeau et al. |
| 9,734,724 B2 | 8/2017 | Zammit et al. |
| 10,139,246 B1 * | 11/2018 | Reddy .................... G01C 23/00 |
| 10,311,738 B2 | 6/2019 | Pratap et al. |
| 2013/0060466 A1 | 3/2013 | Gurusamy et al. |
| 2013/0317739 A1 | 11/2013 | Coulmeau et al. |

OTHER PUBLICATIONS

Schmidt, Erik D., "An Evaluation of RTA Symbols to Improve Pilot Situation Awareness" Spring (2012). Dissertations and Theses. 127, https://commons.erau.edu/edt/127.

Fernandes, Alicia, et al., "Concept of Operations for Management by Trajectory," Prepared for NASA Langley Research Center under contract #NNL16AA17C, Sep. 2018.

Feller, Thomas L., 4D FMS TBO Pilot-Controller Human-in-the-Loop Simulation, May 2011.

Ballin, Mark G., et al. "Prototype Flight Management Capabilities to Explore Temporal RNP Concepts," Downloaded on Nov. 16, 2020 at 08:03:01 UTC from IEEE Xplore.

\* cited by examiner

SYSTEMS AND METHODS FOR FOR PRESENTING AN RTA WAYPOINT WITH ASSOCIATED TIME CONSTRAINTS

CROSS REFERENCE TO RELATED APPLICATION

This application claims priority to Indian Provisional Patent Application No. 202011057525 filed Dec. 31, 2020, the entire content of which is incorporated by reference herein.

TECHNICAL FIELD

The present disclosure relates generally to the presentation of waypoints on flight display systems on an aircraft. More particularly, embodiments of the present disclosure provide systems and methods for presenting a waypoint in a manner that visually communicates associated required time of arrival (RTA) time constraint information.

BACKGROUND

Air traffic control (ATC) procedures direct individual aircraft to separate from each other to maintain safety. Available flight control methods utilize aircraft current positions for separating aircraft. Using aircraft current positions to achieve required separations imposes a high workload for air traffic controllers in the terminal area. In addition, using aircraft current positions to achieve required separations can result in many landing runways not being utilized to their capacity, especially in busiest airports. Therefore, achieving required aircraft separations while also optimizing runway landing capacities at an airport is a technical problem.

Some solutions to this technical problem include utilizing aircraft trajectories, in addition to the aircraft current position (spatially). Other solutions to this technical problem utilize aircraft trajectories, the aircraft current position (spatially), and add the aircraft current position (temporally); the solution that adds the temporal, or time, element, transitions the corresponding aircraft control procedures from three dimensions (3D) to four dimensions (4D). Aircraft following 4D trajectories will reduce air traffic controller workload, increase the capacity/throughput of runway surfaces, reduce time and distance flown, reduce fuel burn by increasing predictability of arrival times at 3D waypoints. A typical 4D flight plan clearance from air traffic controller includes both a position clearance (lat/long/alt) and time clearance. Time clearance is provided as Required Time of Arrival (RTA) to a specified waypoint in flight plan at a specified time.

Current RTA usage is generally limited to a single RTA constraint in a cruise phase of flight. However, as next generation procedures evolve, it is anticipated that RTAs will be become more common and proliferate through other phases of flight, including descent and taxi operations (although no altitude constraint, a waypoint with time). Descent profiles typically provide higher workload to the pilot due to frequency of both lateral track constraints and vertical constraints.

Accordingly, technologically enhanced systems and methods that allow pilots to quickly recognize that a waypoint that has an RTA constraint are desired. The present disclosure provides a technical solution in the form of waypoint symbology that visually communicates that a waypoint has an RTA constraint. Other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a system for an aircraft to receive and process required time of arrival (RTA) waypoint information to present an RTA waypoint with associated time constraints is provided. The system includes: a flight management system (FMS) configured to provide an assigned flight plan with a plurality of waypoints; a display device configured to render a current location and trajectory of the aircraft in a navigation display and in a vertical display; and a controller circuit in operable communication with the FMS and the display device, the controller circuit configured by programming instructions to: locate the RTA waypoint among the plurality of waypoints, as a function of the flight plan and the current location and trajectory of the aircraft; identify a time constraint associated with the RTA waypoint; use the time constraint to determine a type, from among an "at", a "before", and an "after", for the RTA waypoint; assign a preprogrammed visual encoding scheme for the type to the RTA waypoint, the preprogrammed visual encoding scheme including at least one symbol scaled to render next to the RTA waypoint, on the trajectory of the aircraft; and present the RTA waypoint, using the visual encoding scheme, on the display device.

Also provided is a method for presenting an RTA waypoint with associated time constraints on an avionic display of an aircraft, the method includes: rendering a current location and trajectory of the aircraft in a navigation display and in a vertical display on the avionic display; locating the RTA waypoint among a plurality of waypoints comprising a flight plan of the aircraft, and as a function of the current location and trajectory of the aircraft; identifying a time constraint associated with the RTA waypoint; using the time constraint to determine a type, from among an "at", a "before", and an "after", for the RTA waypoint; assigning a preprogrammed visual encoding scheme for the type to the RTA waypoint, the preprogrammed visual encoding scheme including at least one symbol scaled to render next to the RTA waypoint, on the trajectory of the aircraft; and presenting the RTA waypoint, using the visual encoding scheme, on the display device.

In another embodiment, a system for presenting an RTA waypoint with associated time constraints an aircraft is provided. The system includes: a source of an assigned flight plan with a plurality of waypoints; a display device configured to render an avionics display showing a current location and trajectory of the aircraft; and a controller circuit in operable communication with the source and the display device, the controller circuit configured by programming instructions to: locate the RTA waypoint among the plurality of waypoints, as a function of the flight plan and the current location and trajectory of the aircraft; identify a time constraint associated with the RTA waypoint; use the time constraint to determine a type, from among an "at", a "before", and an "after", for the RTA waypoint; assign a preprogrammed visual encoding scheme for the type to the RTA waypoint; and present the RTA waypoint, using the preprogrammed visual encoding scheme, on the avionic display.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and wherein.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described aircraft system.

As used herein, the term "present" refers broadly to any means or method for the distribution of information to a flight crew or other aircraft operator, whether visually, aurally, tactilely, or otherwise.

As mentioned, assuring the separation of individual aircraft to maintain safety, as required by regulating authorities and Air traffic control (ATC) procedures, is a technical problem that can even affect taxi operations (although a taxi operation has no altitude constraint, it can be considered a waypoint with time). Some solutions to this technical problem utilize 4D aircraft trajectories: the aircraft current position (spatially), and the aircraft current position (temporally). A typical 4D flight plan clearance from air traffic controller includes both a position clearance (lat/long/alt) and time clearance. Time clearance is provided as Required Time of Arrival (RTA) to a specified waypoint in flight plan at a specified time.

As next generation procedures evolve, it is anticipated that RTAs will be become more common and proliferate beyond the cruise phase of flight through other phases of flight, including descent. Because descent profiles typically provide a higher workload to the pilot (due to frequency of both lateral track constraints and vertical constraints), providing RTA waypoint guidance to a pilot is a challenging technical problem. This technical problem manifests as a deficiency in a human-machine interface (HMI), because with many available flight guidance systems, it can be very difficult for a pilot to see a big picture of the descent situation.

Provided embodiments provide a technical solution in the form of a system that provides an intuitive visualization on an avionic display of the RTA waypoint with its associated time constraint. With these features, the present disclosure provides an objectively improved HMI over available flight guidance systems.

Figure 1:
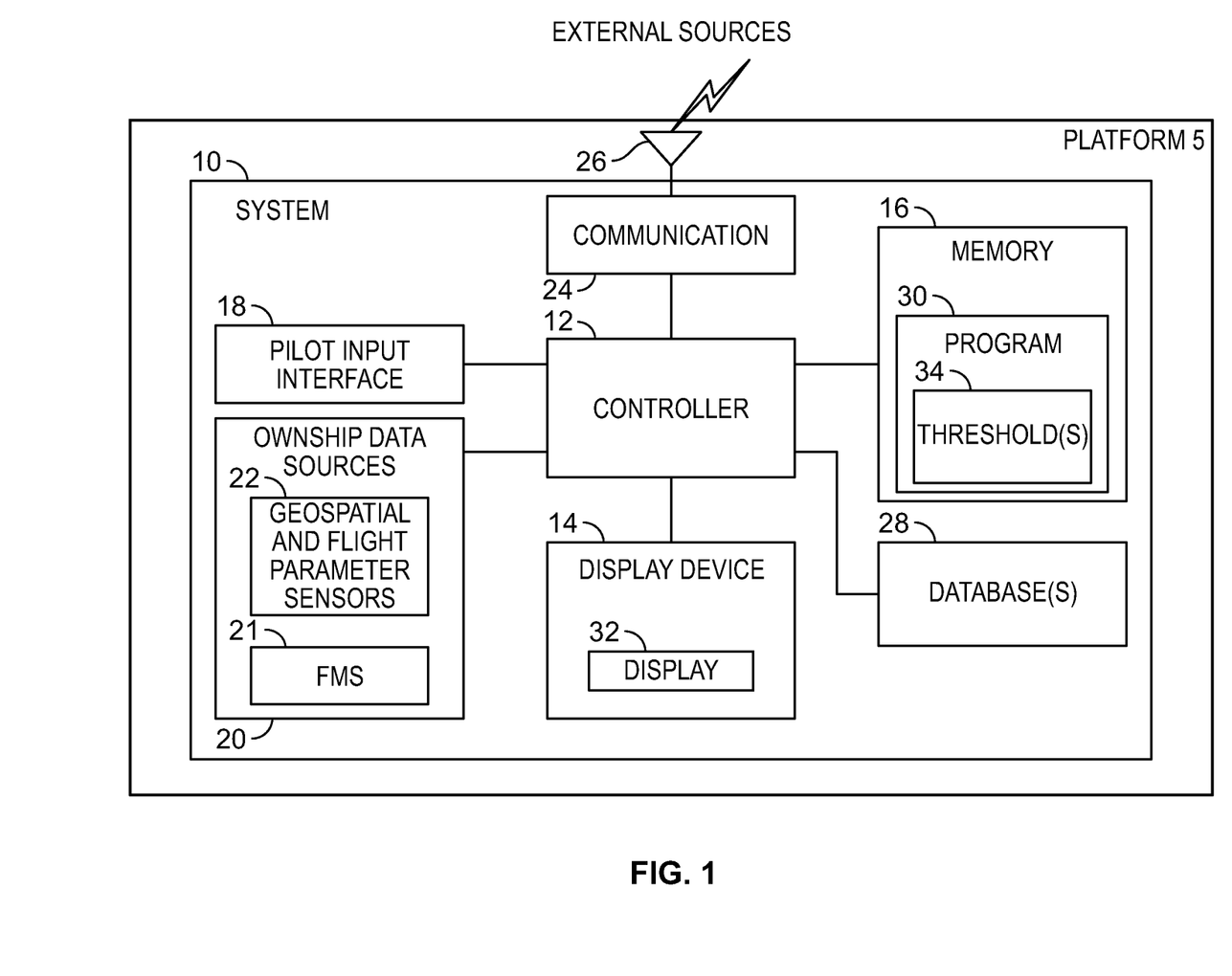
FIG. 1 is a block diagram of a system for presenting an RTA waypoint with associated time constraints, in accordance with an exemplary embodiment of the present disclosure.

FIG. 1 is a block diagram of a system 10 for presenting an RTA waypoint with associated time constraints (shortened herein to "system" 10), as illustrated in accordance with an exemplary and non-limiting embodiment of the present disclosure. The system 10 may be utilized onboard a mobile platform 5 to provide visual guidance, as described herein. In various embodiments, the mobile platform is an aircraft 5, which carries or is equipped with the system 10. As schematically depicted in FIG. 1, the system 10 includes the following components or subsystems, each of which may assume the form of a single device or multiple interconnected devices: a controller circuit 12 operationally coupled to: at least one display device 14; computer-readable storage media or memory 16; an optional input interface 18, and ownship data sources 20 including, for example, a flight management system (FMS) 21 and an array of flight system status and geospatial sensors 22.

In various embodiments, the system 10 may be separate from or integrated within: the flight management system (FMS) and/or a flight control system (FCS). Although schematically illustrated in FIG. 1 as a single unit, the individual elements and components of the system 10 can be implemented in a distributed manner utilizing any practical number of physically distinct and operatively interconnected pieces of hardware or equipment. When the system 10 is utilized as described herein, the various components of the system 10 will typically all be located onboard the Aircraft 5.

The term "controller circuit" (and its simplification, "controller"), broadly encompasses those components utilized to carry-out or otherwise support the processing functionalities of the system 10. Accordingly, controller circuit 12 can encompass or may be associated with a programmable logic array, application specific integrated circuit or other similar firmware, as well as any number of individual processors, flight control computers, navigational equipment pieces, computer-readable memories (including or in addition to memory 16), power supplies, storage devices, interface cards, and other standardized components. In various embodiments, controller circuit 12 embodies one or more processors operationally coupled to data storage having stored therein at least one firmware or software program (generally, computer-readable instructions that embody an algorithm) for carrying-out the various process tasks, calculations, and control/display functions described herein. During operation, the controller circuit 12 may be programmed with and execute the at least one firmware or software program, for example, program 30, that embodies an algorithm described herein for receiving and processing RTA waypoint information to thereby present a visualization of an RTA waypoint with associated time constraints on an avionic display for an aircraft 5, and to accordingly perform the various process steps, tasks, calculations, and control/display functions described herein.

Controller circuit 12 may exchange data, including real-time wireless data, with one or more external sources 50 (for example, Air Traffic Control) to support operation of the system 10 in embodiments. In various embodiments, the controller 12 may receive and process required time of arrival (RTA) waypoint information for the aircraft 5. In this case, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 is a data storage that can encompass any number and type of storage media suitable for storing computer-readable code or instructions, such as the aforementioned software program 30, as well as other data generally supporting the operation of the system 10. Memory 16 may also store one or more threshold 34 values, for use by an algorithm embodied in software program 30. Examples of threshold 34 values include margins of error for altitude deviations, airspeed deviations, and lateral deviations. One or more database(s) 28 are another form of storage media; they may be integrated with memory 16 or separate from it.

In various embodiments, aircraft-specific parameters and information for aircraft 5 may be stored in the memory 16 or in a database 28 and referenced by the program 30. Non-limiting examples of aircraft-specific information includes an aircraft weight and dimensions, performance capabilities, configuration options, and the like.

In various embodiments, two- or three-dimensional map data may be stored in a database 28, including airport features data, geographical (terrain), buildings, bridges, and other structures, street maps, and navigational databases including but not limited to waypoints and airways, which may be updated on a periodic or iterative basis to ensure data timeliness. This map data may be uploaded into the database 28 at an initialization step and then periodically updated, as directed by either a program 30 update or by an externally triggered update.

Flight parameter sensors and geospatial sensors 22 supply various types of data or measurements to controller circuit 12 during Aircraft flight. In various embodiments, the geospatial sensors 22 supply, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data.

With continued reference to FIG. 1, display device 14 can include any number and type of image generating devices on which one or more avionic displays 32 may be produced. When the system 10 is utilized for a manned Aircraft, display device 14 may be affixed to the static structure of the Aircraft cockpit as, for example, a Head Down Display (HDD) or Head Up Display (HUD) unit. In various embodiments, the display device 14 may assume the form of a movable display device (e.g., a pilot-worn display device) or a portable display device, such as an Electronic Flight Bag (EFB), a laptop, or a tablet computer carried into the Aircraft cockpit by a pilot.

At least one avionic display 32 is generated on display device 14 during operation of the system 10; the term "avionic display" is synonymous with the term "aircraft-related display" and "cockpit display" and encompasses displays generated in textual, graphical, cartographical, and other formats. The system 10 can simultaneously generate various types of lateral and vertical avionic displays 32 on which map views and symbology, text annunciations, and other graphics pertaining to flight planning are presented for a pilot to view. The display device 14 is configured to continuously render at least a lateral display showing the Aircraft 5 at its current location and trajectory within the map data. The avionic display 32 generated and controlled by the system 10 can include graphical user interface (GUI) objects and alphanumerical input displays of the type commonly presented on the screens of MCDUs, as well as Control Display Units (CDUs) generally. Specifically, embodiments of avionic displays 32 include one or more two dimensional (2D) avionic displays, such as a horizontal (i.e., lateral) navigation display or vertical navigation display (i.e., vertical situation display VSD); and/or, one or more three dimensional (3D) avionic displays, such as a Primary Flight Display (PFD) or an exocentric 3D avionic display.

In various embodiments, a human-machine interface is implemented as an integration of a pilot input interface 18 and a display device 14. In various embodiments, the human-machine interface is embodied as a touch screen display device 14. In various embodiments, the human-machine interface includes a touch screen display device 14 and at least one additional pilot input interface 18 (such as a keyboard, cursor control device, voice input device, or the like), generally operationally coupled to the display device 14. Via various display and graphics systems processes, the controller circuit 12 may command and control a touch screen display device 14 to generate a variety of graphical user interface (GUI) objects or elements described herein, including, for example, buttons, sliders, and the like, which are used to prompt a user to interact with the human-machine interface to provide user input; and for the controller circuit 12 to activate respective system functions and provide user feedback, responsive to received user input at the GUI element.

In various embodiments, the system 10 may also include a dedicated communications circuit 24 configured to provide a real-time bidirectional wired and/or wireless data exchange for the controller 12 to communicate with the external sources 50 (including, each of: traffic, air traffic control (ATC), satellite weather sources, ground stations, and the like). In various embodiments, the communications circuit 24 may include a public or private network implemented in accordance with Transmission Control Protocol/Internet Protocol architectures and/or other conventional protocol standards. Encryption and mutual authentication techniques may be applied, as appropriate, to ensure data security. In some embodiments, the communications circuit 24 is integrated within the controller circuit 12, and in other embodiments, the communications circuit 24 is external to the controller circuit 12. When the external source 50 is "traffic," the communications circuit 24 may incorporate software and/or hardware for communication protocols as needed for traffic collision avoidance (TCAS), automatic dependent surveillance broadcast (AD SB), and enhanced vision systems (EVS).

In certain embodiments of system 10, the controller circuit 12 and the other components of the system 10 may be integrated within or cooperate with any number and type of systems commonly deployed onboard an aircraft including, for example, the FMS 21. The system 10 includes a source of an assigned flight plan comprising a plurality of waypoints. In various embodiments, the FMS 21 is the source of the assigned flight plan and waypoints.

The disclosed algorithm is embodied in a hardware program or software program (e.g. program 30 in controller circuit 12) and configured to operate when the aircraft 5 is in any phase of flight. The algorithm presents RTA waypoint time constraint information to the pilot and crew via at least the avionic display 32.

In various embodiments, the provided controller circuit 12, and therefore its program 30 may incorporate the programming instructions necessary for: (a) receiving and processing aircraft status data and RTA waypoint information, determining a time constraint for a RTA waypoint, commanding the display device 14 to render the navigation display and the VSD on the avionic display 32, and rendering the RTA waypoint using a visual encoding scheme; and (b) maintaining the human-machine interface (HMI), including any associated graphical user interface (GUI) presented on the display device 14.

Figure 2:
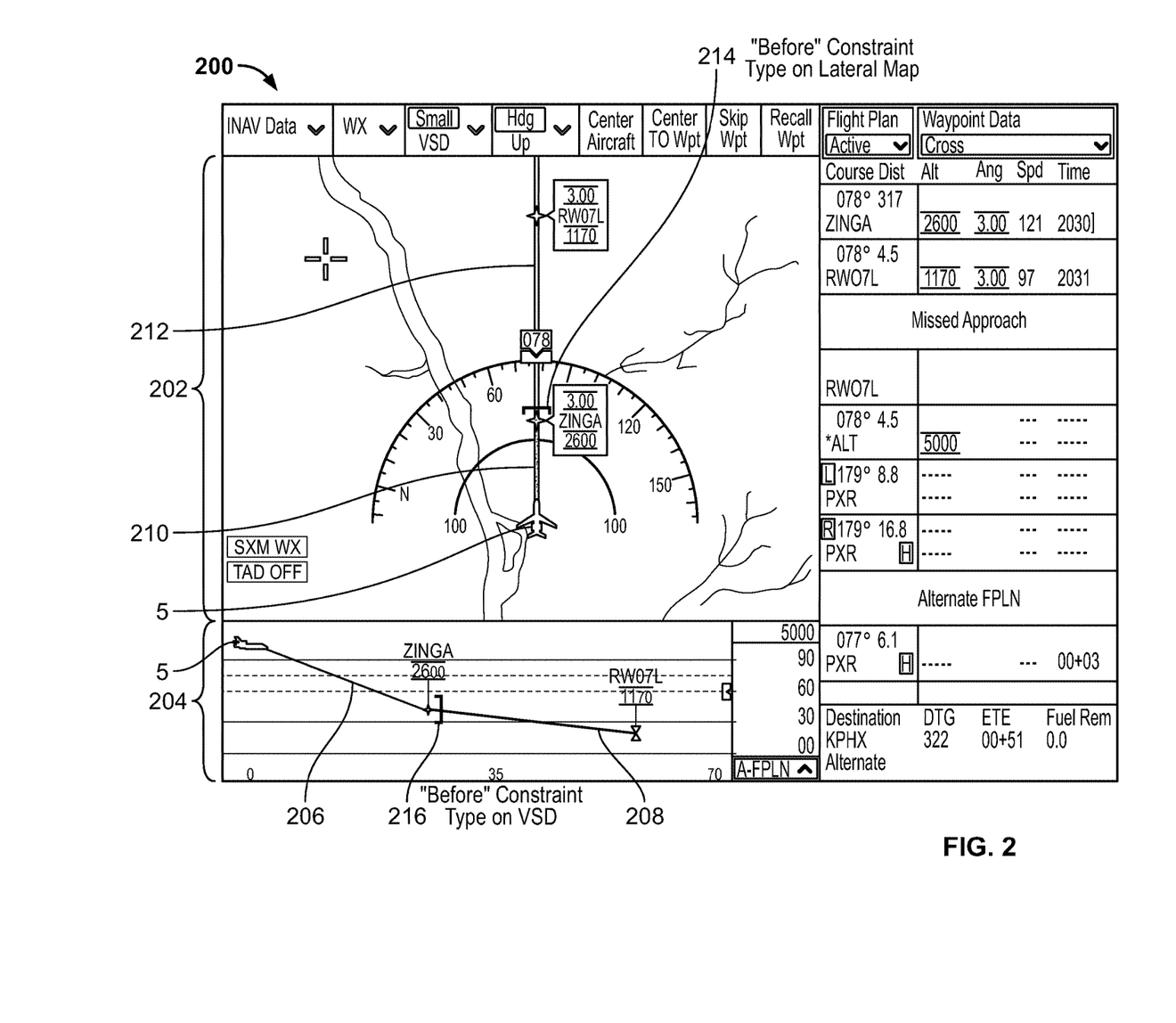
FIGS. 2-4 are simplified illustrations introducing features of an avionic display generated by a for presenting an RTA waypoint with associated time constraints, in accordance with an exemplary embodiment of the present disclosure.
Figure 3:
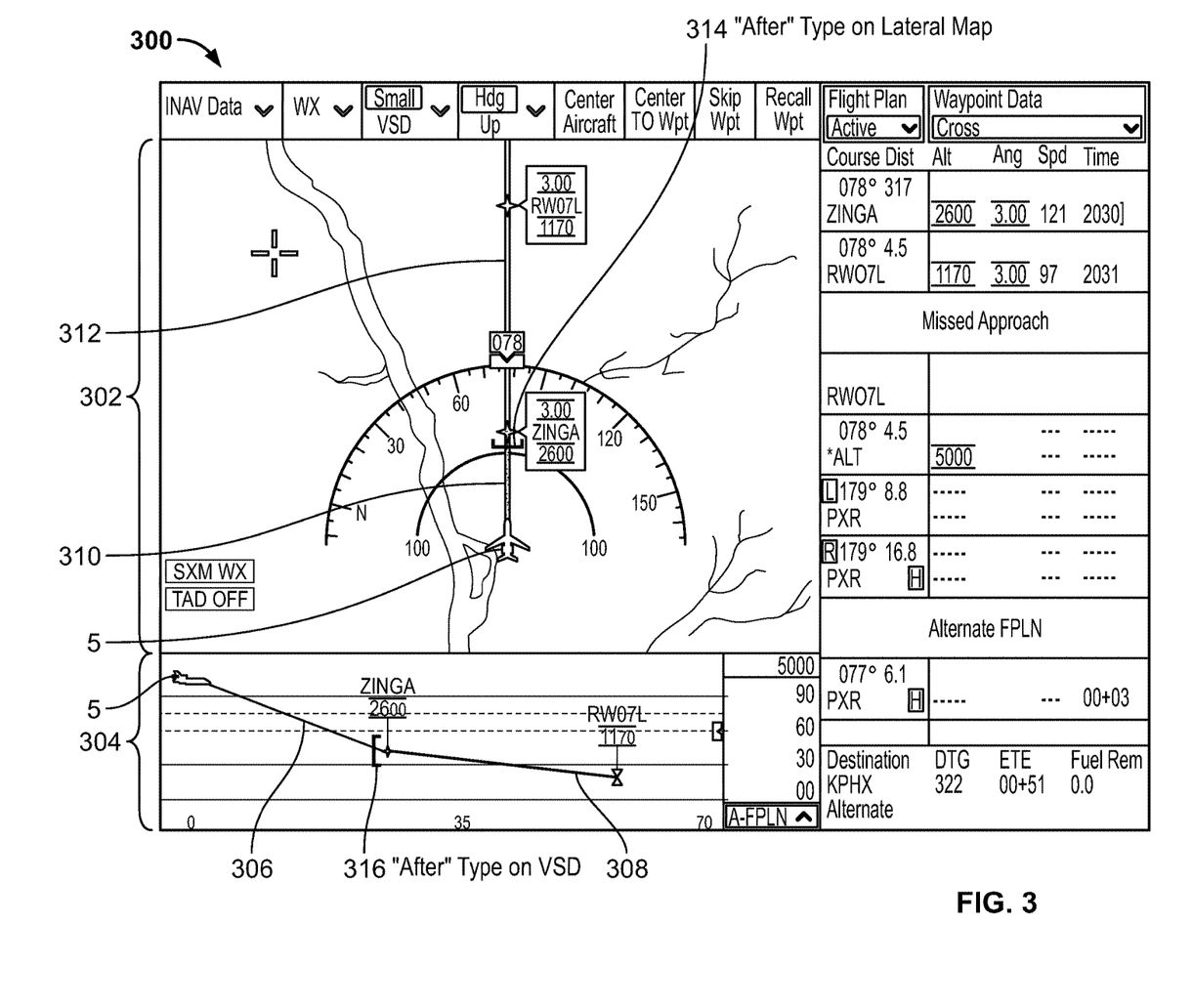
Figure 4:
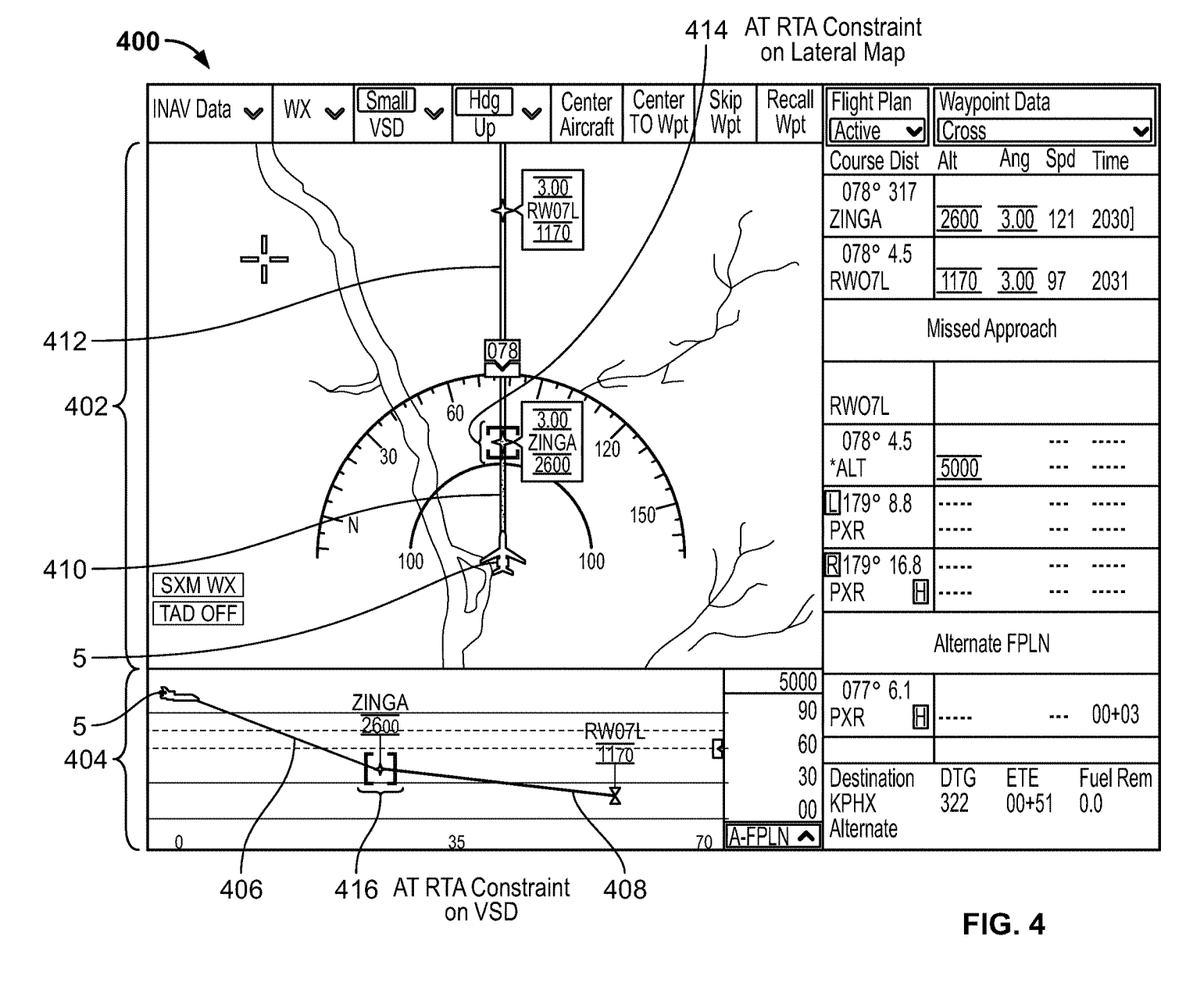
Figure 5:
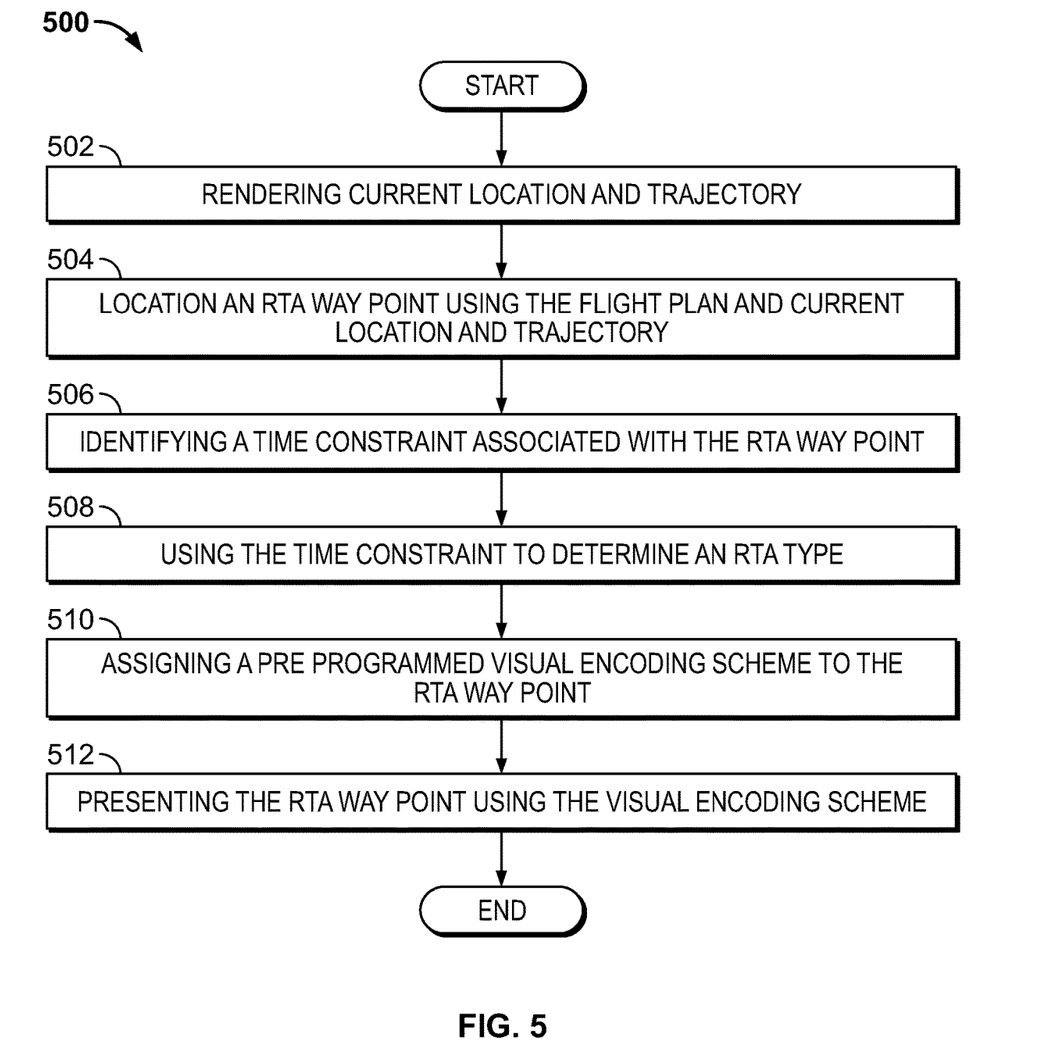
FIG. 5 is an exemplary flow diagram illustrating a method for presenting an RTA waypoint with associated time constraints, in accordance with the present disclosure.

Turning now to FIGS. 2-5, the operation of various embodiments is described. FIGS. 2-4 provide simplified illustrations to introduce features of a presentation of an RTA waypoint with associated time constraints, and FIG. 5 provides an example method for presenting an RTA waypoint with associated time constraints.

During operation, the controller circuit 12, which is programmed by programming instructions to receive and process aircraft status data and RTA waypoint information, commands the display device 14 to render a symbol for the aircraft 5 at its current location and current trajectory in a lateral display and in a vertical display. Avionic display 200 includes a horizontal or navigation display (INAV) 202 and a vertical situation display (VSD) 204. Aircraft 5 is shown on a trajectory 206 and 208 on the VSD 204 and on trajectory 210 and 212 on the navigation display 202. Avionic display 300 includes a horizontal or navigation display (INAV) 302 and a vertical situation display (VSD) 304. Aircraft 5 is shown on a trajectory 306 and 308 on the VSD 304 and on trajectory 310 and 312 on the navigation display 302. Avionic display 400 includes a horizontal or navigation display (INAV) 402 and a vertical situation display (VSD) 404. Aircraft 5 is shown on a trajectory 406 and 408 on the VSD 404 and trajectory 410 and 412 on the navigation display 402.

The controller 12 locates an RTA waypoint that is ahead of the aircraft 5 on its current trajectory, from among the plurality of waypoints making up the flight plan of the aircraft 5. In the example of FIGS. 2-4, the controller 12 located the RTA waypoint ZINGA at altitude 2600, as a function of (e.g., by comparing) the flight plan and the current location and trajectory of the aircraft.

The controller 12 additionally identifies a time constraint associated with the RTA waypoint. In various embodiments, an Air Traffic Controller (at ATC) can issue 3 types of RTA constraints. Using ZINGA as the example waypoint name, the three types of RTA constraints are: (1) an "AT" constraint, for example, "Cross ZINGA AT 11:30:45z"; (2) a "Before" constraint, for example, "Cross ZINGA BEFORE 11:30:45z"; and, (3) an "After" constraint, for example, "Cross ZINGA AFTER 11:30:45z".

Since it is known that there will be three types of RTA constraints, the system 10 includes, for each type of RTA waypoint, a distinctly different preprogrammed visual encoding scheme. Each preprogrammed visual encoding scheme includes at least one symbol (or graphical user interface (GUI) object) scaled to render next to the RTA waypoint, on the trajectory of the aircraft, without obscuring relevant background data on the respective avionic display 32. Further, in various embodiments, the symbol may be open on a side facing a waypoint. To put this into context, left-to-right nomenclature can be used. For example, viewing either the navigation display or the vertical situation display, rotate the image until the aircraft 5 is on the left, and the aircraft trajectory ahead of the aircraft is from left to right, with the RTA waypoint therein, The preprogrammed visual encoding scheme places a symbol on the left or on the right of the RTA waypoint, on the trajectory of the aircraft.

The controller 12 uses the time constraint associated with the RTA waypoint to determine a type for the RTA waypoint, from among an "at", a "before", and an "after", as described above. The controller 12 may then reference the preprogrammed visual encoding schemes to assign one of the visual encoding schemes for the type to the RTA waypoint.

The controller 12 then presents the RTA waypoint, using the visual encoding scheme, on the display device 14.

In some embodiments, such as is shown in FIGS. 2-4, brackets are used as the symbols or GUI objects, as follows: for an "after" type, a bracket that is open to a right side, placed on a left side of the waypoint; for a "before" type, a bracket that is open to a left side, placed on a right side of the waypoint; and for an "at" type, enclosing the waypoint with a bracket on each side of the waypoint.

In FIG. 2, the RTA waypoint ZINGA is a "Before" type and the avionic display 200 depicts a bracket 214 placed on the trajectory 212 after the RTA waypoint, open toward the waypoint in the navigation display 202, and bracket 216 placed on trajectory 208 after the RTA waypoint, open left (i.e., toward the waypoint ZINGA) on the VSD 204. In FIG. 3, the RTA waypoint ZINGA is an "After" type and the avionic display 300 depicts a bracket 314 placed on the trajectory 310 before the RTA waypoint, open toward the waypoint in the navigation display 302, and bracket 316 placed on trajectory 306 before the RTA waypoint, open right (i.e., toward the waypoint ZINGA) on the VSD 204. In FIG. 4, the RTA waypoint ZINGA is an "At" type and the avionic display 400 depicts the waypoint ZINGA at least partially enclosed by two symbols 414 (a bracket on the trajectory 410 before the waypoint and a bracket on the trajectory 412 after the RTA waypoint, each positioned to be open toward the waypoint) in the navigation display 402, and similarly, at least partially enclosed by two symbols 416 (a bracket on the trajectory 406 before the waypoint and a bracket on the trajectory 408 after the RTA waypoint, each positioned to be open toward the waypoint) on the VSD 404.

In other embodiments, carrots, parenthesis, and braces are used to employ the same open to the right, open to the left, and at least partially enclosing of the waypoint. In still other embodiments, a vertical bar can be used for the symbols or GUI objects. In the provided embodiments, the symbols are scaled to proportion with the waypoint such that background information is minimally affected or occluded.

In the above embodiments, the waypoint itself is presented as a symbol on the navigation display or the VSD. In other embodiments, the waypoint may be presented as text. In various embodiments, the waypoint is presented as text on a portion of the avionic display 32 dedicated to alphanumeric information, and the waypoint is presented using a preprogrammed visual encoding scheme, as described above. In an embodiment, the waypoint is a ground marker, used for a taxi operation; in this example, the waypoint has no altitude constraint, but has a time constraint.

As can be seen in FIGS. 2-4, the presentation (i.e., the visualization) of the RTA waypoint, using these visual encoding schemes to convey the time constraint, provides an objective improvement in the HMI, as one can immediately see where the aircraft is with respect to assumed spatial and temporal RTA waypoint targets.

Returning to FIG. 5, a flow diagram is provided illustrating a method 500 for presenting an RTA waypoint with associated time constraints, in accordance with the present disclosure. At 502, the system 10 is determined to have been programmed with the algorithm and the preprogrammed visual encoding schemes, and the method determines and renders a current location and trajectory of the aircraft 5 in a navigation display and in a vertical display. At 504 the method locates the RTA waypoint among the plurality of waypoints making up the flight plan of the aircraft 5, as a function of the flight plan and the current location and trajectory of the aircraft. At 506, the method identifies a time constraint associated with the RTA waypoint. At 508, the methods uses the time constraint to determine a type, from among an "at", a "before", and an "after", for the RTA waypoint. At 510, the method assigns a preprogrammed visual encoding scheme to the RTA waypoint. At 512, the method presents the RTA waypoint, using the visual encoding scheme, on the avionic display 32. After 512 the method may end or may return to 502.

As such, disclosed herein is flight display system for presenting RTA waypoints with their time constraint information, using the visual encoding scheme, on an avionic display 32. The system 10 improves upon available algorithms by presenting the RTA waypoint in a way that integrates therewith the flight constraint information. Additionally, the system 10 can improve the safety of taxi operations (as mentioned, although a taxi operation has no altitude constraint, it can be considered a waypoint with time). Thus, the system 10 provides an objectively improved human-machine interface (HMI).

While the present disclosure has provided exemplary embodiments directed to a flight display system, it will be appreciated that the embodiments presented herein can be extended to other applications where approach assistance may be desirable, and where approaches may be improved through the use of a display. For example, other suitable applications may include maritime applications, railroad applications, industrial/manufacturing plant applications, space travel applications, simulator applications, and others as will be appreciated by those having ordinary skill in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is being understood that various changes may be made in the function and arrangement of elements described in an exemplary embodiment without departing from the scope of the invention as set forth in the appended claims.

What is claimed is:

1. A system for an aircraft to receive and process required time of arrival (RTA) waypoint information to present an RTA waypoint with associated time constraints, the system comprising:
   a flight management system (FMS) configured to provide an assigned flight plan with a plurality of waypoints;
   at least one geospatial sensor configured to generate real time location sensor data;
   a display device; and
   a controller circuit in operable communication with the FMS, the at least one geospatial sensor, and the display device, the controller circuit configured by programming instructions to:
      generate a current location and a current trajectory of the aircraft based on the real time location sensor data received from the at least one geospatial sensor;
      issue a command to the display device to render a symbol for the aircraft to overlay a display of a flight path associated with the flight plan at the current location and the current trajectory in a navigation display and a vertical display;
      receive a time constraint associated with the RTA waypoint among the plurality of waypoints from an air traffic controller (ATC);
      locate the RTA waypoint among the plurality of waypoints, as a function of the flight plan and the current location along the current trajectory of the aircraft;
      use the time constraint to determine a type, from among an "at", a "before", and an "after", for the RTA waypoint;
      assign a preprogrammed visual encoding scheme for the type to the RTA waypoint, the preprogrammed visual encoding scheme including at least one symbol scaled to overlay the display of the flight path next to the RTA waypoint on the current trajectory of the aircraft; and
      issue a command to the display device to display the visual encoding scheme for the type to overlay the display of the flight path next to the RTA waypoint on the current trajectory of the aircraft on the navigation display and the vertical display.

2. The system of claim 1, wherein the preprogrammed visual encoding scheme includes, for an "after" type, a bracket that is open to a right side, placed on a left side of the waypoint.

3. The system of claim 1, wherein the preprogrammed visual encoding scheme includes, for a "before" type, a bracket that is open to a left side, placed on a right side of the waypoint.

4. The system of claim 1, wherein the preprogrammed visual encoding scheme includes, for an "at" type, at least partially enclosing the waypoint with a bracket on each side of the waypoint, each of the brackets being open to the waypoint.

5. The system of claim 1, wherein the preprogrammed visual encoding scheme includes:
   for an "after" type, a bracket that is open to a right side, placed on a left side of the waypoint;
   for a "before" type, a bracket that is open to a left side, placed on a right side of the waypoint; and
   for an "at" type, enclosing the waypoint with a bracket on each side of the waypoint.

6. The system of claim 5, wherein the controller circuit is further configured to:
   present the waypoint as a symbol, using the visual encoding scheme, on the display device.

7. The system of claim 5, wherein the controller circuit is further configured to:
   present the waypoint as text, using the visual encoding scheme, on the display device.

8. A method for presenting an RTA waypoint with associated time constraints on an avionic display of an aircraft, the method comprising:

generating a current location and a current trajectory of the aircraft based on real time location sensor data received from at least one geo spatial sensor;

issuing a command to a display device to render a symbol for the aircraft to overlay a display of a flight path associated with a flight plan at the current location and the current trajectory in a navigation display and a vertical display;

receiving a time constraint associated with the RTA waypoint among a plurality of waypoints from an air traffic controller (ATC);

locating the RTA waypoint among the plurality of waypoints comprising the flight plan of the aircraft, and as a function of the current location along the current trajectory of the aircraft;

using the time constraint to determine a type, from among an "at", a "before", and an "after", for the RTA waypoint;

assigning a preprogrammed visual encoding scheme for the type to the RTA waypoint, the preprogrammed visual encoding scheme including at least one symbol scaled to overlay the display of the flight path next to the RTA waypoint on the current trajectory of the aircraft; and issuing a command to the display device to display the visual encoding scheme for the type to overlay the display of the flight path next to the RTA waypoint on the current trajectory of the aircraft on the navigation display and the vertical display.

9. The method of claim 8, wherein the preprogrammed visual encoding scheme includes, for an "after" type, a bracket that is open to a right side, placed on a left side of the waypoint.

10. The method of claim 8, wherein the preprogrammed visual encoding scheme includes, for a "before" type, a bracket that is open to a left side, placed on a right side of the waypoint.

11. The method of claim 8, wherein the preprogrammed visual encoding scheme includes, for an "at" type, at least partially enclosing the waypoint with a bracket on each side of the waypoint, each of the brackets being open to the waypoint.

12. The method of claim 8, wherein the preprogrammed visual encoding scheme includes:
for an "after" type, a bracket that is open to a right side, placed on a left side of the waypoint;
for a "before" type, a bracket that is open to a left side, placed on a right side of the waypoint; and
for an "at" type, enclosing the waypoint with a bracket on each side of the waypoint.

13. The method of claim 12, further comprising, presenting the waypoint as a symbol, using the visual encoding scheme, on the display device.

14. The method of claim 12, further comprising, presenting the waypoint as text, using the visual encoding scheme, on the display device.

15. A system for presenting an RTA waypoint with associated time constraints an aircraft, the system comprising:

a source of an assigned flight plan with a plurality of waypoints;

at least one geospatial sensor configured to generate real time location sensor data;

a display device; and a controller circuit in operable communication with the source, the at least one geospatial sensor, and the display device, the controller circuit configured by programming instructions to:

generate a current location and a current trajectory of the aircraft based on the real time location sensor data received from the at least one geospatial sensor;

issue a command to the display device to render a symbol for the aircraft to overlay a display of a flight path associated with the flight plan at the current location and the current trajectory in a navigation display and a vertical display;

receive a time constraint associated with the RTA waypoint among the plurality of waypoints from an air traffic controller (ATC);

locate the RTA waypoint among the plurality of waypoints, as a function of the flight plan and the current location along the current trajectory of the aircraft;

use the time constraint to determine a type, from among an "at", a "before", and an "after", for the RTA waypoint;

assign a preprogrammed visual encoding scheme for the type to the RTA waypoint; and issue a command to the display device to display the assigned visual encoding scheme for the type to overlay the display of the flight path next to the RTA waypoint on the current trajectory of the aircraft on the navigation display and the vertical display.

16. The system of claim 15, wherein the preprogrammed visual encoding scheme includes, for an "after" type, a bracket that is open to a right side, placed on a left side of the waypoint.

17. The system of claim 15, wherein the preprogrammed visual encoding scheme includes, for a "before" type, a bracket that is open to a left side, placed on a right side of the waypoint.

18. The system of claim 15, wherein the preprogrammed visual encoding scheme includes, for an "at" type, at least partially enclosing the waypoint with a bracket on each side of the waypoint, each of the brackets being open to the waypoint.

19. The system of claim 15, wherein the preprogrammed visual encoding scheme includes:
for an "after" type, a bracket that is open to a right side, placed on a left side of the waypoint;
for a "before" type, a bracket that is open to a left side, placed on a right side of the waypoint; and
for an "at" type, enclosing the waypoint with a bracket on each side of the waypoint.

20. The system of claim 19, wherein the controller circuit is further configured to:
present the waypoint as a symbol, using the visual encoding scheme, on the display device.

* * * * *

UNITED STATES PATENT AND TRADEMARK OFFICE
CERTIFICATE OF CORRECTION

| | |
|---|---|
| PATENT NO. | : 11,676,497 B2 |
| APPLICATION NO. | : 17/207010 |
| DATED | : June 13, 2023 |
| INVENTOR(S) | : Subash Samuthirapandian and Thea Feyereisen |

It is certified that error appears in the above-identified patent and that said Letters Patent is hereby corrected as shown below:

In the Claims

Column 11, Line 3 (Claim 8), "geo spatial" should be -- geospatial --

Signed and Sealed this
Thirtieth Day of April, 2024

Katherine Kelly Vidal
*Director of the United States Patent and Trademark Office*